March 30, 1954 N. R. POLLOCK ET AL 2,673,437
IMPLEMENT MOUNTING FRAME FOR CUTTER UNITS
Filed Nov. 28, 1952 3 Sheets-Sheet 1
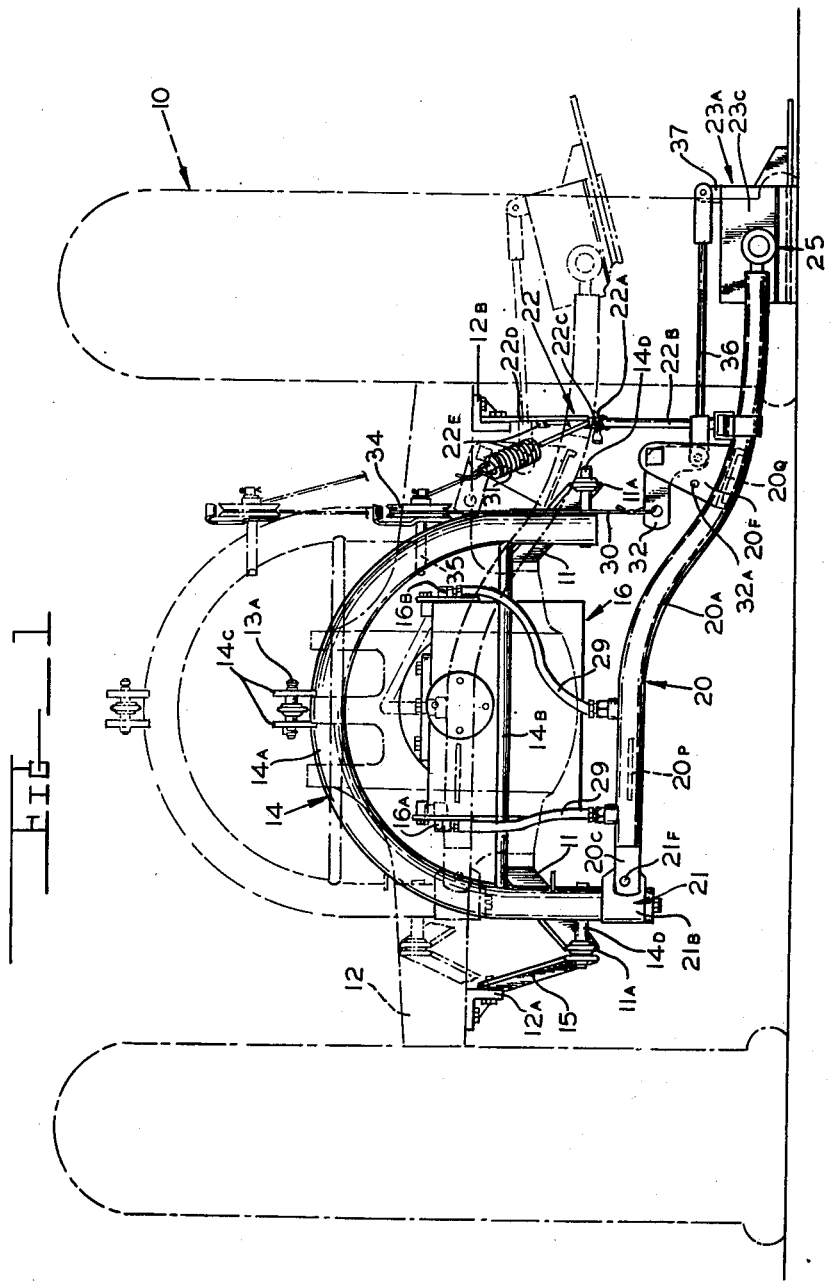
INVENTORS
ROBERT L. ERWIN &
NORMAN R. POLLOCK
BY
AND
ATTORNEYS

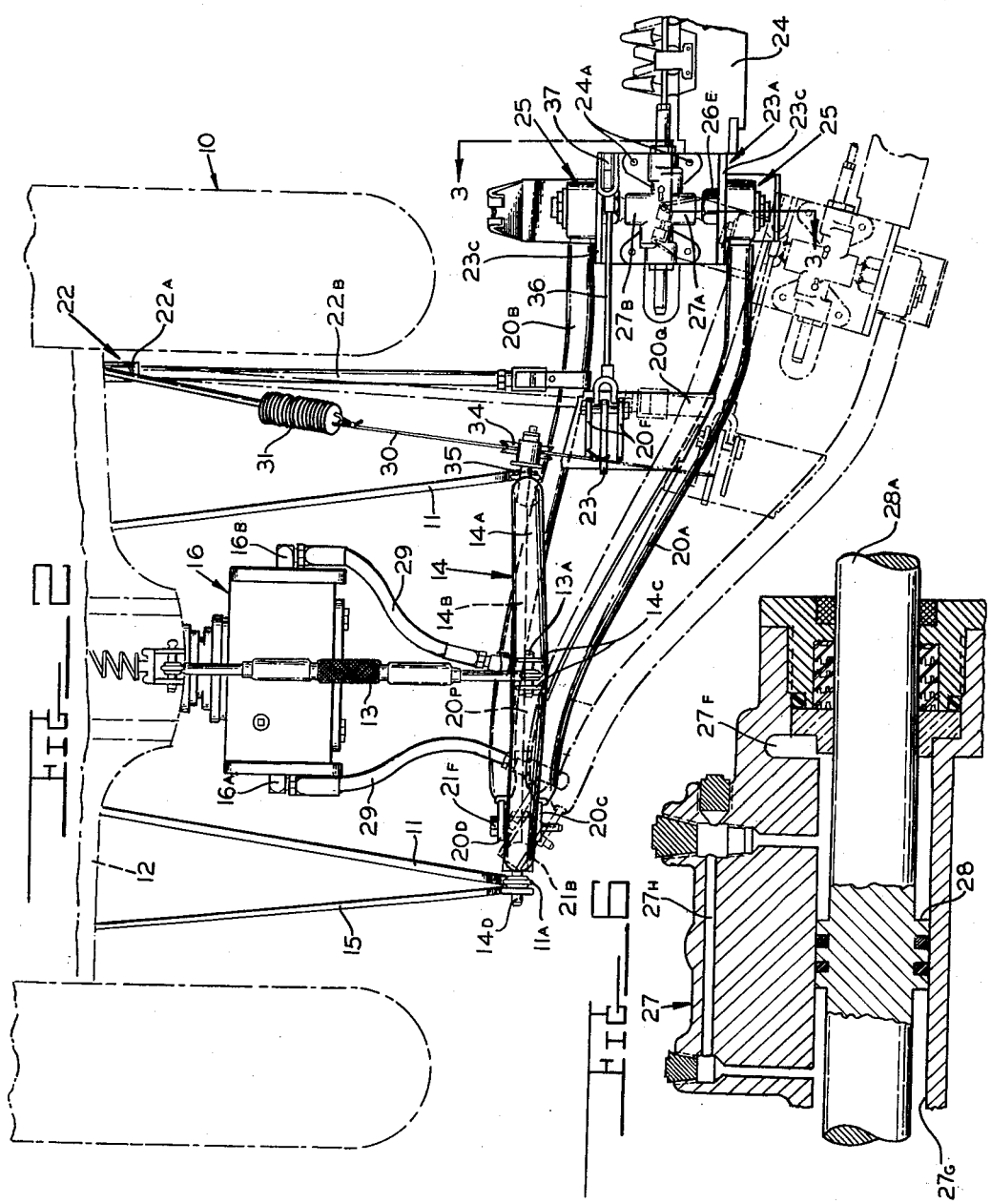

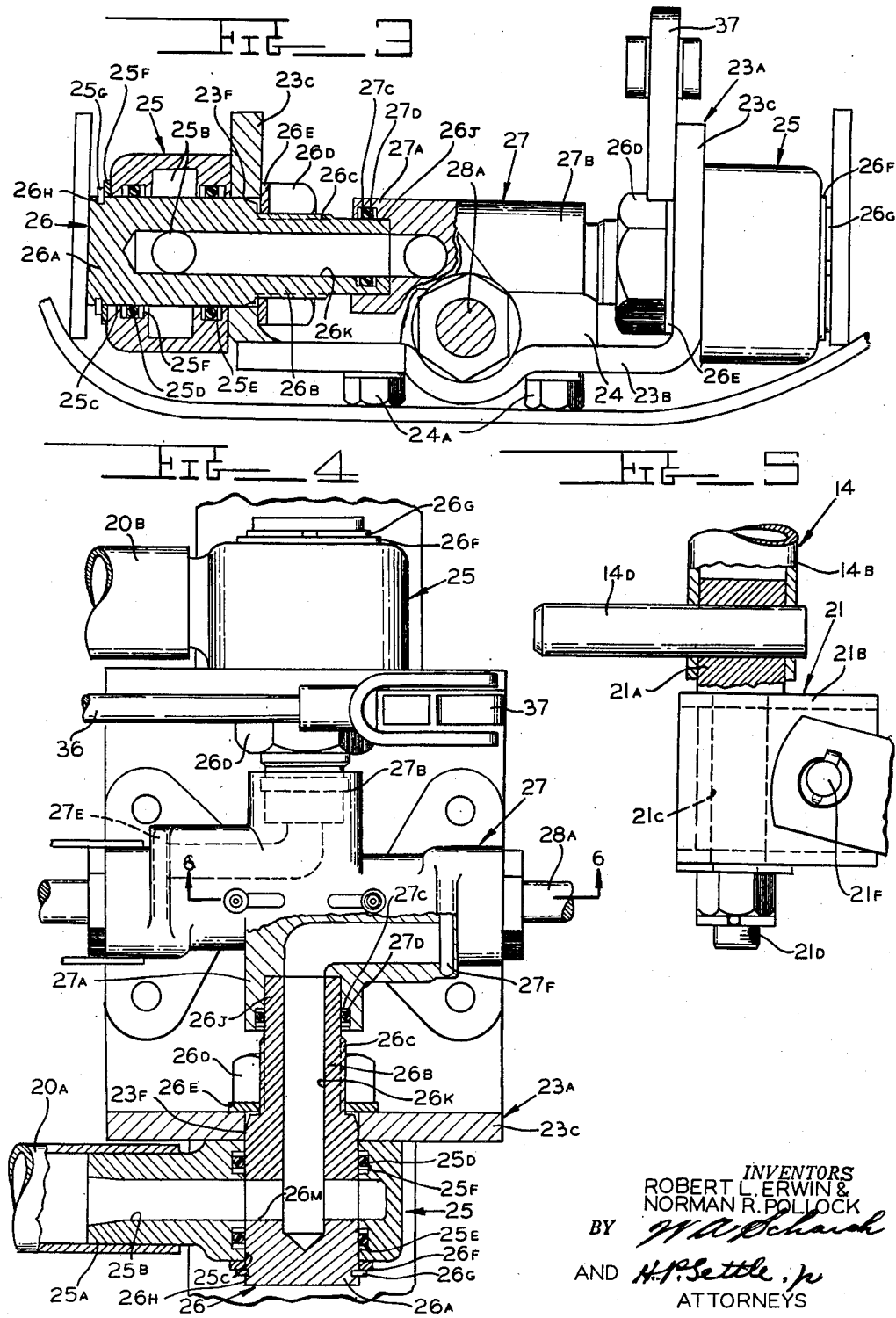

Patented Mar. 30, 1954

2,673,437

UNITED STATES PATENT OFFICE 2,673,437

IMPLEMENT MOUNTING FRAME FOR CUTTER UNITS

Norman R. Pollock and Robert L. Erwin, Royal Oak, Mich., assignors, by mesne assignments, to Ford Motor Company, Dearborn, Mich., a corporation of Delaware Application November 28, 1952, Serial No. 322,964

6 Claims. (Cl. 56—25)

This invention relates to an improved hydraulic mower, and particularly to an improved frame construction for a tractor mounted hydraulically actuated mower.

There are an abundance of examples in the prior art of reciprocating knife mowers wherein an hydraulic motor is utilized to drive the reciprocating knife. However, when such mowers are applied to agricultural uses, which necessarily requires that the mower frame be designed to permit raising and lowering movements of the mower for transport purposes and swing-back movements of the mower cutter bar for protection against obstructions, the resulting mower constructions have heretofore been of such a complicated nature as to completely offset any economic advantages inherent in utilizing the hydraulic type of actuation.

Accordingly, it is an object of this invention to provide an improved frame construction for an hydraulically actuated mower.

A particular object of this invention is to provide a frame construction for mounting an hydraulically actuated mower upon a prime mover, such as a tractor, characterized by the fact that the structural frame elements are utilized as fluid conduits for conducting pressured fluid from a suitable source on the tractor to the fluid motor mounted upon the cutter bar structure of the mower.

Still another object of this invention is to provide an improved frame structure for an hydraulically actuated mower which is particularly adaptable for mounting upon a well-known type of tractor having power-lifted, trailing hitch links.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a rear elevational view of an hydraulically actuated mower constructed in accordance with this invention, shown in mounted relationship with respect to a tractor;

Figure 2 is a plan view of the device shown in Figure 1;

Figure 3 is an enlarged scale, partial sectional view taken on the plane 3—3 of Figure 2;

Figure 4 is a plan view, partly in section, of that portion of the device illustrated in Figure 3;

Figure 5 is an enlarged scale view, partly in section, of the drag bar swivel mounting; and Figure 6 is an enlarged scale sectional view taken on the plane 6—6 of Figure 4.

As shown on the drawings:

While not limited thereto, a mower constructed in accordance with this invention is particularly adaptable for use with a well-known type of tractor 10 having laterally spaced, power-lifted, trailing hitch links 11 secured to its rear axle housing 12, together with a centrally disposed top link 13, which is pivoted to the top central portions of such rear axle housing. A supporting or carrying frame 14 for the mower comprises an inverted U-shaped piece of tubing 14a having a rod 14b rigidly secured in bracing relationship between its two vertical arm portions. At the top central portion of frame 14 a pair of ears 14c are welded and provide a connection to the top link 13 by virtue of a pin 13a. Near the lower extremities of each arm portion of the frame 14, a laterally projecting mounting pin 14d is rigidly mounted and such pin is received in the spherical type bearing sleeves 11a conventionally provided in the ends of the hitch links 11. Additionally, for added rigidity, a stabilizer link 15 may be mounted on the one mounting pin 14d and extends to a suitable bracket 12a provided on the lateral extremity of the tractor rear axle housing 12 to which it is pivotally secured. It is therefore apparent that the mower mounting frame 14 will be elevated or lowered directly by the power-lifted movements of the tractor hitch links 11.

The tractor 10 is provided with a conventional rear power-take-off (not shown) and an hydraulic pumping unit 16 is mounted on such power-take-off and has two outlet connections 16a and 16b for supplying pressured fluid to opposite sides of a piston (described later) which drives the reciprocating knife of the hydraulic mower. While the details of construction of the pumping unit 16 are immaterial to the understanding of this invention, such unit may partake of any conventional construction, for example a pumping unit similar to that shown in United States Patent No. 2,414,519 to J. C. Green, Jr.

In accordance with this invention, a drag bar structure 20 is provided which comprises a pair of generally parallel tubular elements 20a and 20b which are rigidly interconnected by suitable bracing plates 20p and 20q. At the one end of drag bar 20 a universal type swivel mounting structure 21 is provided for swivelly mounting the drag bar upon the left hand arm (as viewed in Figure 1) of the mower frame 14. As best illustrated in Figure 5, such mounting is accomplished by a plug member 21a which is insertable into the open end of the mower frame 14 and secured thereto by the mounting pin 14d which passes through suitable apertures in plug 21a and mower frame 14. A yoke 21b is provided which defines a vertical bore 21a which is journaled upon the depending stem portion 21d of plug 21a. Yoke 21b also defines a transverse bore 21e which horizontally journals a pivot pin 21f. A pair of spaced vertical lugs 20c and 20d are respectively rigidly secured to the ends of the drag bar elements 20a and 20b and are traversed by the horizontal pin 21f. Hence, the drag bar may swivel in a horizontal plane about the vertical axis bearing provided by the plug 21a, and in a vertical plane about the horizontal axis bearing provided by the pin 21f.

To retain the drag bar structure in its normal horizontal transverse relationship with respect to the tractor 10, an extensible linkage 22 is provided which comprises a sleeve 22a which is swivelly attached by an arm 22d to a suitable mounting bracket 12b provided on the tractor rear axle housing 12. A rod 22b is slidable within the sleeve 22a and is suitably secured to the drag bar structure 20. A spring pressed latch (not shown) is mounted within a lateral cylindrical extension 22c, integrally formed on sleeve 22a, and such latch normally cooperates with a suitable not (not shown) in rod 22b to retain such rod in such position as to maintain the drag bar structure 20 in transverse relationship with respect to the tractor 10. Obviously, upon the occurrence of any overload encountered by the mower structure carried by the outer end of the drag bar structure 20, the spring pressed latch will be overcome and the rod 22b will slide rearwardly with respect to the sleeve 22a until the enlarged head portion 22e on the end of such rod contacts the forward end of sleeve 22a.

The laterally projecting ends of the tubular drag bar elements 20a and 20b are sufficiently spaced apart so as to receive therebetween a U-shaped yoke 23a which forms part of the cutter bar structure. As best shown in Figure 3, the cutter bar yoke 23a is of U-shaped configuration having a base portion 23b secured to a conventional cutter bar assembly 24 and spaced upstanding arm portions 23c. Bolts 24a are utilized to effect the securement of yoke 23a to cutter bar 24.

In each of the ends of the drag bar tubular elements 20a and 20b, a connecting plug 25 is mounted. Plug 25 has a reduced diameter stem portion 25a which is snugly insertable within the end of the corresponding tubular element and defines a longitudinally extending bore 25b which is, of course, in fluid communication with the hollow interior of the particular tubular element 20a or 20b. Additionally, plug 25 is provided with an enlarged transverse aperture 25c and such aperture is counterbored at two points along its axial length as indicated at 25d and 25e. A pivot pin 26 is provided which has an enlarged cylindrical head portion 26a journaled in the transverse aperture 25c and projecting through a suitable aperture 23f provided in the adjacent upstanding arm 23c of yoke 23. The outer end of pivot pin 26 has a suitable stop washer 26f mounted thereon and retained against axial displacement by a snap ring 26g which seats in a suitable annular groove 26h. Pivot pin 26 has a reduced diameter stem portion 26b which projects inwardly beyond the adjacent yoke arm 23c and has a threaded portion 26c formed thereon upon which a nut 26d and washer 26e are mounted to effect the clamping of the pivot pin to yoke 23. The extreme inner end 26j of pivot pin 26 is a smooth cylindrical configuration, for a purpose to be later described. An axial hole 26k is bored into pivot pin 26 from the inner end and a transverse hole 26m is drilled through the enlarged diameter end portion 26a to intersect the axial hole 26k and provide fluid communication with the bore 25b in plug 25. Suitable fluid seals 25f are mounted in each of the counterbores 25d and 25e to prevent loss of fluid between plug 25 and pivot pin 26.

An hydraulic motor housing 27 is suitably mounted on cutter bar 24 and the bolts 24a may be utilized to effect such mounting. Hydraulic motor housing 27 defines a pair of oppositely disposed fluid ports 27a and 27b which are respectively located in alignment with the holes 23f provided in the arm portions of yoke 23 and of suitable diameter so as to pivotally receive the cylindrical inner end portions 26 of the pivot pins 26. The outer ends of ports 27a and 27b are provided with counterbores 27c to receive suitable fluid seals 27d therein. Suitable passages 27e and 27f are provided in fluid motor housing 27 which respectively communicate with the cylinder bore 27g at opposite sides of a piston 28 which is reciprocable in such cylinder bore. Piston 28 is suitably mounted on a rod 28a which is in turn suitably connected to the reciprocable knife 24b which is conventionally mounted on the cutter bar 24. A bleed passage 27h is provided in housing 27 communicating with opposite ends of cylinder bore 27g.

From the foregoing description, it is apparent that the tubular frame elements 20a and 20b of the drag bar structure 20 may be conveniently employed to conduct pressured fluid respectively to opposite sides of the piston 28 of the hydraulic motor unit which actuates the reciprocating knife. The hydraulic connection of the tubular frame elements 20a and 20b to the pressured fluid outlets 16a and 16b may be conveniently effected by conventional flexible hose elements 29, which respectively connect to the tubular frame elements 20a and 20b at points near the swivel mounting of the drag bar structure 20 on the mower supporting frame 14. The lengths of the flexible hose elements 29 are selected so as to accommodate all possible swivelling movements which the drag bar 20 is permitted to have relative to the supporting frame 14 and, hence, the transmission of pressured fluid to the hydraulic motor of the mower is unimpaired in any position that the drag bar structure 20 may assume with respect to the tractor.

In order to effect the elevation of the drag bar structure 20 and the cutter bar unit 24, a well-known type of lifting arrangement is provided comprising a cable 30 which is connected at one end to a spring 31 which is in turn connected to sleeve 22a, and at its other end is connected to a bell crank lever 32 which is suitably pivoted to an upstanding bracket 20f provided on the medial portions of the drag bar structure 20. The medial portions of cable 30 are trained over a pulley 34 which is journaled on a suitable horizontal pin 35 which is rigidly secured to mower frame 14. The other end of bell crank lever 32 is connected by an adjustable length rod 36 to a lever 37 which is rigidly secured to the cutter bar frame 24. Hence, elevation of the tractor hitch links 11 will elevate the carrying frame 14 and thus effect a tightening of the cable

30. This in turn will produce an upward rocking of the cutter bar frame 24 about the axis provided by pivot pins 26 until the bell crank engages a suitable stop 32a. Further lifting movement of the hitch links 11 will then result in a bodily lifting of the entire mower structure. It should be noted that the fluid connections to the hydraulic motor are not affected in any manner by such raising or lowering movements.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a tractor having a pressured fluid source, a tractor mower comprising a mounting frame connectable to the tractor, a laterally disposed drag bar swivelly attached to said mounting frame at one end, releasable means connecting the other end of said drag bar to the tractor, a cutter bar unit attached to said other end of said drag bar, said cutter bar unit including a movable knife element and an hydraulic motor for powering said knife element, said drag bar comprising at least one rigid tubular element extending substantially the full length of said drag bar, flexible conduit means adjacent said one end of said drag bar for connecting said tubular element in fluid conducting relationship with the fluid pressure source on the tractor, and fluid conducting means connecting the other end of said tubular element to said hydraulic motor.

2. In a hydraulic powered mower having a cutter bar frame, an elongated knife reciprocably mounted on said cutter bar frame, and a fluid motor for driving said knife; the improvements comprising a drag bar structure adapted for connection at one end to a prime mover, said drag bar structure including a pair of spaced, generally parallel, rigid tubular members adapted to transmit hydraulic fluid, and means for mounting said cutter bar frame on said drag bar structure comprising a yoke having a base portion secured to said cutter bar frame and spaced upright portions, a pair of hollow, axially aligned, pivot pins respectively pivotally connecting the ends of said tubular members with said upright portions of said yoke for relative movement in a vertical plane, the hollow portions of said pins communicating respectively with the interior bores of said tubular members, said hydraulic motor including a housing having a pair of oppositely disposed ports respectively receiving the opposed ends of said pivot pins in fluid transmitting relation, thereby permitting pivotal vertical movement of said cutter bar frame relative to said drag bar without interruption of fluid transmission to said hydraulic motor.

3. The combination defined in claim 2 wherein a hollow plug is inserted in the end of each tubular member, each of said plugs having a longitudinal bore communicating with the interior of said tubular member and a transverse bore pivotally journaling said hollow pivot pin.

4. For use with a tractor having a pressured fluid source, a mower comprising a drag bar structure, means for mounting one end of said drag bar for swivelling movements relative to the tractor, releasable means for normally securing said drag bar structure in a transverse position relative to the tractor, a cutter bar unit including a movable knife and an hydraulic motor, means for mounting said cutter bar unit on said other end of said drag bar structure, said hinge means and said drag bar structure being hollow and defining intercommunicating fluid passages, flexible conduit means for connecting the tractor adjacent end of said fluid passages to said pressured fluid source, and means connecting the other end of said passages to said fluid motor.

5. In an hydraulic mower, a cutter bar frame, and an hydraulic motor housing mounted on one end of said cutter bar frame, a U-shaped yoke having a base portion secured to said cutter bar frame and upstanding arm portions disposed on opposite sides of said motor housing, said arm portions having aligned apertures therein, said motor housing having a pair of oppositely disposed fluid ports respectively aligned with said apertures, a drag bar structure comprising two spaced structural members, and hollow pivot pins respectively insertable through the ends of said structural members, said apertures and said ports, thereby pivotally connecting said drag bar structure to said cutter bar frame, and means for supplying fluid to said hydraulic motor through said hollow pivot pins.

6. The combination defined in claim 5 wherein said structural members are tubular and a hollow plug is inserted in the end of each tubular member, each of said plugs having a longitudinal bore communicating with the interior of said tubular member and a transverse bore pivotally journaling said hollow pivot pin.

NORMAN R. POLLOCK.
ROBERT L. ERWIN.

No references cited.